United States Patent
Workley et al.

(10) Patent No.: US 9,010,647 B2
(45) Date of Patent: Apr. 21, 2015

(54) MULTIPLE SENSOR DETECTOR SYSTEMS AND DETECTION METHODS OF MAGNETIC CARDS AND DEVICES

(71) Applicants: James H. Workley, Imperial, PA (US); Geoffrey D. Shippee, Edgeworth, PA (US); Kevin David Bruner, Pittsburgh, PA (US)

(72) Inventors: James H. Workley, Imperial, PA (US); Geoffrey D. Shippee, Edgeworth, PA (US); Kevin David Bruner, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 63 days.

(21) Appl. No.: 13/770,647

(22) Filed: Feb. 19, 2013

(65) Prior Publication Data

US 2014/0117094 A1    May 1, 2014

Related U.S. Application Data

(60) Provisional application No. 61/719,703, filed on Oct. 29, 2012, provisional application No. 61/739,614, filed on Dec. 19, 2012.

(51) Int. Cl.
*G06K 19/00* (2006.01)
*G06K 7/08* (2006.01)

(52) U.S. Cl.
CPC ..................................... *G06K 7/084* (2013.01)

(58) Field of Classification Search
USPC ......... 235/435, 439, 441, 449, 451, 487, 492, 235/493
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |

(Continued)

FOREIGN PATENT DOCUMENTS

| JP | 05210770 A | 8/1993 |
|---|---|---|
| WO | WO9852735 | 11/1998 |

(Continued)

OTHER PUBLICATIONS

U.S. Appl. No. 60/594,300, Poidomani et al.

(Continued)

*Primary Examiner* — Matthew Mikels

(57) ABSTRACT

A powered card may include a plurality of types of sensors used to detect a read-head of a card reader. Detection of a read-head may include comparing characteristics of a detection event to characteristics of an expected detection event and/or a sequence of expected detection events. An inductive read-head sensor may include a coil of a dynamic magnetic stripe communication device.

14 Claims, 8 Drawing Sheets

(56) References Cited

U.S. PATENT DOCUMENTS

| | | | |
|---|---|---|---|
| 5,434,405 | A | 7/1995 | Finkelstein et al. |
| 5,478,994 | A | 12/1995 | Rahman et al. |
| 5,479,512 | A | 12/1995 | Weiss |
| 5,484,997 | A | 1/1996 | Haynes |
| 5,485,519 | A | 1/1996 | Weiss |
| 5,585,787 | A | 12/1996 | Wallerstein |
| 5,591,949 | A | 1/1997 | Bernstein |
| 5,608,203 | A | 3/1997 | Finkelstein et al. |
| 5,623,552 | A | 4/1997 | Lane |
| 5,657,388 | A | 8/1997 | Weiss |
| 5,834,747 | A | 11/1998 | Cooper |
| 5,834,756 | A | 11/1998 | Gutman et al. |
| 5,856,661 | A | 1/1999 | Finkelstein et al. |
| 5,864,623 | A | 1/1999 | Messina et al. |
| 5,866,949 | A | 2/1999 | Schueller |
| 5,907,142 | A | 5/1999 | Kelsey |
| 5,913,203 | A | 6/1999 | Wong et al. |
| 5,937,394 | A | 8/1999 | Wong et al. |
| 5,955,021 | A | 9/1999 | Tiffany, III |
| 5,956,699 | A | 9/1999 | Wong et al. |
| 6,025,054 | A | 2/2000 | Tiffany, III |
| 6,045,043 | A | 4/2000 | Bashan et al. |
| 6,076,163 | A | 6/2000 | Hoffstein et al. |
| 6,085,320 | A | 7/2000 | Kaliski |
| 6,095,416 | A | 8/2000 | Grant et al. |
| 6,130,621 | A | 10/2000 | Weiss |
| 6,145,079 | A | 11/2000 | Mitty et al. |
| 6,157,920 | A | 12/2000 | Jakobsson et al. |
| 6,161,181 | A | 12/2000 | Haynes, III et al. |
| 6,176,430 | B1 | 1/2001 | Finkelstein et al. |
| 6,182,894 | B1 | 2/2001 | Hackett et al. |
| 6,189,098 | B1 | 2/2001 | Kaliski |
| 6,199,052 | B1 | 3/2001 | Mitty et al. |
| 6,206,293 | B1 | 3/2001 | Gutman et al. |
| 6,240,184 | B1 | 5/2001 | Huynh et al. |
| 6,241,153 | B1 | 6/2001 | Tiffany, III |
| 6,256,873 | B1 | 7/2001 | Tiffany, III |
| 6,269,163 | B1 | 7/2001 | Rivest et al. |
| 6,286,022 | B1 | 9/2001 | Kaliski et al. |
| 6,308,890 | B1 | 10/2001 | Cooper |
| 6,313,724 | B1 | 11/2001 | Osterweil |
| 6,389,442 | B1 | 5/2002 | Yin et al. |
| 6,393,447 | B1 | 5/2002 | Jakobsson et al. |
| 6,411,715 | B1 | 6/2002 | Liskov et al. |
| 6,446,052 | B1 | 9/2002 | Juels |
| 6,460,141 | B1 | 10/2002 | Olden |
| 6,592,044 | B1 | 7/2003 | Wong et al. |
| 6,607,127 | B2 | 8/2003 | Wong |
| 6,609,654 | B1 | 8/2003 | Anderson et al. |
| 6,631,849 | B2 | 10/2003 | Blossom |
| 6,655,585 | B2 | 12/2003 | Shinn |
| 6,681,988 | B2 | 1/2004 | Stack et al. |
| 6,705,520 | B1 | 3/2004 | Pitroda et al. |
| 6,755,341 | B1 | 6/2004 | Wong et al. |
| 6,764,005 | B2 | 7/2004 | Cooper |
| 6,769,618 | B1 | 8/2004 | Finkelstein |
| 6,805,288 | B2 | 10/2004 | Routhenstein et al. |
| 6,811,082 | B2 | 11/2004 | Wong |
| 6,813,354 | B1 | 11/2004 | Jakobsson et al. |
| 6,817,532 | B2 | 11/2004 | Finkelstein |
| 6,873,974 | B1 | 3/2005 | Schutzer |
| 6,902,116 | B2 | 6/2005 | Finkelstein |
| 6,970,070 | B2 | 11/2005 | Juels et al. |
| 6,980,969 | B1 | 12/2005 | Tuchler et al. |
| 6,985,583 | B1 | 1/2006 | Brainard et al. |
| 6,991,155 | B2 | 1/2006 | Burchette, Jr. |
| 7,013,030 | B2 | 3/2006 | Wong et al. |
| 7,035,443 | B2 | 4/2006 | Wong |
| 7,039,223 | B2 | 5/2006 | Wong |
| 7,044,394 | B2 | 5/2006 | Brown |
| 7,051,929 | B2 | 5/2006 | Li |
| 7,083,094 | B2 | 8/2006 | Cooper |
| 7,100,049 | B2 | 8/2006 | Gasparini et al. |
| 7,100,821 | B2 | 9/2006 | Rasti |
| 7,111,172 | B1 | 9/2006 | Duane et al. |
| 7,114,652 | B2 | 10/2006 | Moullette et al. |
| 7,122,447 | B2 | 10/2006 | Abe |
| 7,136,514 | B1 | 11/2006 | Wong |
| 7,140,550 | B2 | 11/2006 | Ramachandran |
| 7,163,153 | B2 | 1/2007 | Blossom |
| 7,195,154 | B2 | 3/2007 | Routhenstein |
| 7,197,639 | B1 | 3/2007 | Juels et al. |
| 7,219,368 | B2 | 5/2007 | Juels et al. |
| 7,225,537 | B2 | 6/2007 | Reed |
| 7,225,994 | B2 | 6/2007 | Finkelstein |
| 7,246,752 | B2 | 7/2007 | Brown |
| 7,298,243 | B2 | 11/2007 | Juels et al. |
| 7,334,732 | B2 | 2/2008 | Cooper |
| 7,337,326 | B2 | 2/2008 | Palmer et al. |
| 7,346,775 | B2 | 3/2008 | Gasparini et al. |
| 7,356,696 | B1 | 4/2008 | Jakobsson et al. |
| 7,357,319 | B1 | 4/2008 | Liu et al. |
| 7,359,507 | B2 | 4/2008 | Kaliski |
| 7,360,688 | B1 | 4/2008 | Harris |
| 7,363,494 | B2 | 4/2008 | Brainard et al. |
| 7,380,710 | B2 | 6/2008 | Brown |
| 7,398,253 | B1 | 7/2008 | Pinnell |
| 7,404,087 | B2 | 7/2008 | Teunen |
| 7,424,570 | B2 | 9/2008 | D'Albore et al. |
| 7,427,033 | B1 | 9/2008 | Roskind |
| 7,454,349 | B2 | 11/2008 | Teunen et al. |
| 7,461,250 | B1 | 12/2008 | Duane et al. |
| 7,461,399 | B2 | 12/2008 | Juels et al. |
| 7,472,093 | B2 | 12/2008 | Juels |
| 7,472,829 | B2 | 1/2009 | Brown |
| 7,494,055 | B2 | 2/2009 | Fernandes et al. |
| 7,502,467 | B2 | 3/2009 | Brainard et al. |
| 7,502,933 | B2 | 3/2009 | Jakobsson et al. |
| 7,503,485 | B1 | 3/2009 | Routhenstein |
| 7,516,492 | B1 | 4/2009 | Nisbet et al. |
| 7,523,301 | B2 | 4/2009 | Nisbet et al. |
| 7,530,495 | B2 | 5/2009 | Cooper |
| 7,532,104 | B2 | 5/2009 | Juels |
| 7,543,739 | B2 | 6/2009 | Brown et al. |
| 7,559,464 | B2 | 7/2009 | Routhenstein |
| 7,562,221 | B2 | 7/2009 | Nystrom et al. |
| 7,562,222 | B2 | 7/2009 | Gasparini et al. |
| 7,580,898 | B2 | 8/2009 | Brown et al. |
| 7,584,153 | B2 | 9/2009 | Brown et al. |
| 7,591,426 | B2 | 9/2009 | Osterweil et al. |
| 7,591,427 | B2 | 9/2009 | Osterweil |
| 7,602,904 | B2 | 10/2009 | Juels et al. |
| 7,631,804 | B2 | 12/2009 | Brown |
| 7,639,537 | B2 | 12/2009 | Sepe et al. |
| 7,641,124 | B2 | 1/2010 | Brown et al. |
| 7,660,902 | B2 | 2/2010 | Graham et al. |
| 7,828,207 | B2 | 11/2010 | Cooper |
| 8,011,577 | B2 | 9/2011 | Mullen et al. |
| 2001/0034702 | A1 | 10/2001 | Mockett et al. |
| 2001/0047335 | A1 | 11/2001 | Arndt et al. |
| 2002/0059114 | A1 | 5/2002 | Cockrill et al. |
| 2002/0082989 | A1 | 6/2002 | Fife et al. |
| 2002/0096570 | A1 | 7/2002 | Wong et al. |
| 2002/0120583 | A1 | 8/2002 | Keresman, III et al. |
| 2003/0034388 | A1 | 2/2003 | Routhenstein et al. |
| 2003/0052168 | A1 | 3/2003 | Wong |
| 2003/0057278 | A1 | 3/2003 | Wong |
| 2003/0116635 | A1 | 6/2003 | Taban |
| 2003/0152253 | A1 | 8/2003 | Wong |
| 2003/0163287 | A1 | 8/2003 | Vock et al. |
| 2003/0173409 | A1 | 9/2003 | Vogt et al. |
| 2003/0179909 | A1 | 9/2003 | Wong et al. |
| 2003/0179910 | A1 | 9/2003 | Wong |
| 2003/0226899 | A1 | 12/2003 | Finkelstein |
| 2004/0035942 | A1 | 2/2004 | Silverman |
| 2004/0069853 | A1* | 4/2004 | Aharonson .......... 235/454 |
| 2004/0133787 | A1* | 7/2004 | Doughty et al. ...... 713/186 |
| 2004/0162732 | A1 | 8/2004 | Rahim et al. |
| 2004/0172535 | A1 | 9/2004 | Jakobsson |
| 2004/0177045 | A1 | 9/2004 | Brown |
| 2005/0043997 | A1 | 2/2005 | Sahota et al. |
| 2005/0080747 | A1 | 4/2005 | Anderson et al. |
| 2005/0086160 | A1 | 4/2005 | Wong et al. |
| 2005/0086177 | A1 | 4/2005 | Anderson et al. |

(56) References Cited

U.S. PATENT DOCUMENTS

| | | |
|---|---|---|
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0231611 A1 | 10/2006 | Chakiris et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0230793 A1 | 9/2010 | Kudose et al. |
| 2011/0028184 A1 | 2/2011 | Cooper |

FOREIGN PATENT DOCUMENTS

| | | |
|---|---|---|
| WO | WO02047019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers http://homes.cerias.purdue.edu/~jtli/paper/fc07.pdf. As viewed on Apr. 12, 2010.
English translation of JP 05210770 A.
USPTO, International Search Report, Jun. 28, 2013.

* cited by examiner

600

US 9,010,647 B2

MULTIPLE SENSOR DETECTOR SYSTEMS AND DETECTION METHODS OF MAGNETIC CARDS AND DEVICES

CROSS-REFERENCE TO RELATED APPLICATIONS

This application claims the benefit of U.S. Provisional Patent Application No. 61/719,703, titled "MULTIPLE SENSOR DETECTOR SYSTEMS AND DETECTION METHODS OF MAGNETIC CARDS AND DEVICES," filed Oct. 29, 2012 and U.S. Provisional Patent Application No. 61/739,614, titled "MAGNETIC CARDS AND DEVICES INCLUDING AN INDUCTIVE SENSOR," filed Dec. 19, 2012, all of which are hereby incorporated by reference herein in their entirety.

BACKGROUND OF THE INVENTION

This invention relates to magnetic cards, devices and payment systems.

SUMMARY OF THE INVENTION

Systems and methods are provided for detecting a read-head of a card reader using multiple types of read-head sensors on a powered card.

A card may include a dynamic magnetic communications device. Such a dynamic magnetic communications device may take the form of a magnetic encoder or an electromagnetic generator. A magnetic encoder may change the information located on a magnetic medium such that a magnetic stripe reader may read changed magnetic information from the magnetic medium. An electromagnetic generator may generate electromagnetic fields that directly communicate data to a magnetic stripe reader. Such an electromagnetic generator may communicate data serially to a read-head of the magnetic stripe reader.

A card may include one or more displays (e.g., bi-stable, non bi-stable, LCD, LED, or electrochromic displays) to display card numbers, verification codes and/or bar codes. All, or substantially all, of one or more surfaces of a card may be a display. Electrodes of the display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs and/or IC chips to communicate to one or more RFID readers or IC chip readers, respectively. According to some example embodiments, a card may include three or more different types of output devices. A card may include devices to receive information. For example, an RFID and IC chip may both receive information and communicate information to an RFID and IC chip reader, respectively.

A device for receiving wireless information signals may be provided. A light sensing device and/or sound sensing device may be utilized to receive information wirelessly.

A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). According to at least one example embodiment, the code may indicate which of multiple buttons of a card is pressed. Such a code may be stored in a memory of the card prior to issuance to a user.

A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize. A code may indicate which button is pressed by a user and additional features may be provided to a user (e.g., additional to the payment transaction). For example, additional features may include rewards for use of a card.

A dynamic magnetic stripe communications device may include an electromagnetic generator that comprises an inductor (e.g., a coil). Current may be provided through this inductor to create an electromagnetic field operable to communicate with the read-head of a magnetic stripe reader. The drive circuit may vary the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, and/or via light (e.g., an ultraviolet or blue spectrum light) such that the electronics become embedded between the two layers of the polymer and a card is formed.

A card may include a plurality of types of sensors used to detect a read-head of a card reader. The types of sensors may be, for example, capacitive, inductive, photoelectric, sonic, magnetic and/or thermal.

A capacitive sensor may be a low power sensor including one or more conductive pads. An inductive sensor may be a high power sensor including one or more coils or portions of one or more coils. The one or more coils may include, for example, a coil of a dynamic magnetic stripe communications device and/or one or more coils separate from the dynamic magnetic stripe communications device.

Multiple types of read-head sensors may be used to improve the reliability of read-head detection, and to improve data security, without significantly increasing power consumption. For example, a capacitive sensor may detect any object in proximity to the sensor using little or no power. An inductive sensor may only detect objects that significantly change a coupling between a coil (or coil portion) and another coil (or another coil portion), and may use relatively high power (e.g., relative to capacitive sensing). For example, an inductive sensor may only detect conductive materials and therefore the read-head detection accuracy of an inductive sensor may be greater than a capacitive sensor. Accordingly, by activating an inductive sensor after a capacitive sensor detects an object, and for a relatively short period of time, a combination of sensors may be used to decrease false read-head detections and decrease erroneous data transmission without unduly increasing power consumption.

In an inductive sensor, a magnitude of a current or voltage across a detection coil may be used to discriminate between objects detected by the inductive sensor. For example, the greater the conductivity of an object, the greater an increase or decrease in the current or voltage across the detection coil. Therefore, the inductive sensor may be used to determine whether an object is an expected object based on conductivity. For example, an inductive sensor may detect relatively little current or voltage change in the presence of organic matter (e.g., a finger) and relatively high current or voltage change (e.g., a decrease in current or voltage) in the presence of a read-head. Further, a current or voltage change may be different even between types of read-heads (e.g., due to geometry, material types, etc.). Thus, an inductive sensor may be used to detect known types of read-heads, and detect unknown types of read-heads (e.g., skimmers) based on a detection signal. If a detection by a card does not match an expected detection, the card may not energize a dynamic magnetic stripe communications device to communicate data.

Additional and/or alternative sensors may be included in a card to increase the accuracy of detection and increase data security. For example, a card may include a photoelectric sensor to determine whether a card is within a card reader or exposed to ambient environmental conditions.

A sequence of events may be used to increase data security. For example, a sequence of detections of sensors on a card may indicate whether a card experiences an expected set of events, such as sequential detection by different types of sensors during a card swipe. If a sequence of detections by a card does not match an expected sequence, the card may not energize a dynamic magnetic stripe communications device to communicate data.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
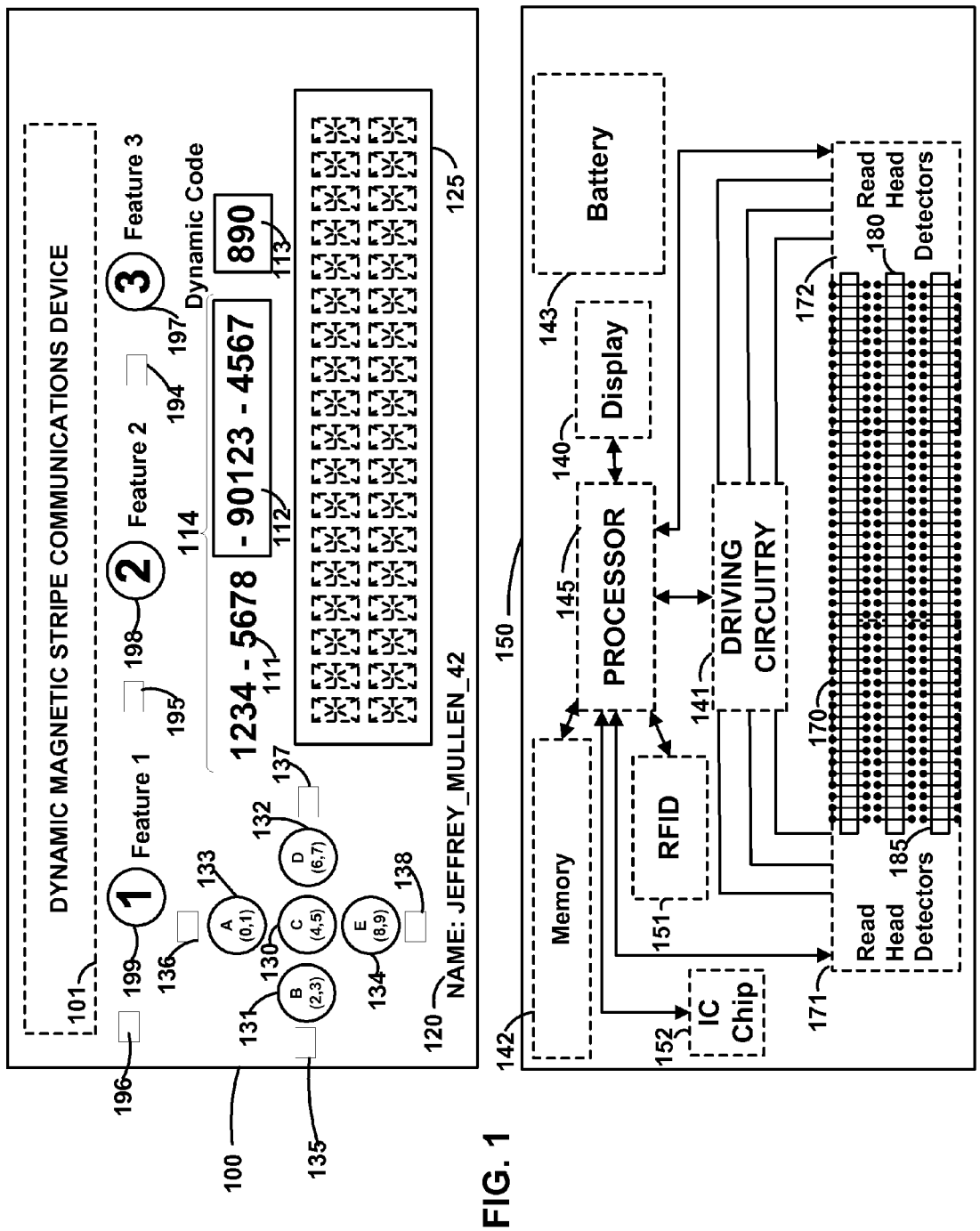
FIG. 1 is an illustration of a card and architecture constructed in accordance with the principles of the present invention.

FIG. 1 shows card 100 that may include, for example, dynamic magnetic stripe communications device 101, one or more displays (e.g., displays 112, 113 and 125)), permanent information 120, one or more buttons (e.g., buttons 130-134 and 197-199), lights 135-138 and 194-196, and dynamic number 114 which may include a permanent portion 111. Permanent portion 111 may be, for example, printed, embossed and/or laser etched on card 100.

Multiple displays may be provided on card 100 for various purposes. For example, display 112 may display a dynamic number entirely, and/or partially. Display 113 may be utilized to display a dynamic code (e.g., a dynamic security code). Display 125 may display logos, barcodes, and/or one or more lines of information (e.g., may display a coupon code).

Card 100 may include permanent information 120 including, for example, information specific to a user (e.g., a user's name and/or username) and/or information specific to a card (e.g., a card issue date and/or a card expiration date).

Card 100 may include a dynamic magnetic communications device. Such a dynamic magnetic communications device may take the form of a magnetic encoder or an electromagnetic generator. A magnetic encoder may change the information located on a magnetic medium such that a magnetic stripe reader may read changed magnetic information from the magnetic medium. An electromagnetic generator may generate electromagnetic fields that directly communicate data to a magnetic stripe reader. Such an electromagnetic generator may communicate data serially to a read-head of the magnetic stripe reader.

Card 100 may include one or more buttons, for example, buttons 130-134 and 197-199. Buttons 130-134 and 197-199 may be, for example, mechanical buttons, capacitive buttons, light sensors and/or a combination thereof.

Buttons 197-199 may be used, for example, to communicate information through dynamic magnetic stripe communications device 101 indicative of a user's desire to communicate a single track of magnetic stripe information. Persons skilled in the art will appreciate that pressing a button (e.g., button 199) may cause information to be communicated through device 101 when an associated read-head detector detects the presence of a read-head of a magnetic stripe reader and/or at a specific frequency.

Each of buttons 197-199 may be utilized to communicate (e.g., after the button is pressed and after a read-head detection circuit detects a read-head of a reader) information indicative of a user selection (e.g., to communicate one or more tracks of magnetic stripe data). Multiple buttons may be provided on a card and each button may be associated with a different user selection.

Different third party features may be, for example, associated with different buttons and a particular feature may be selected by pressing an associated button. According to at least one example embodiment, each of buttons 197-199 may be associated with, for example, a different third party service provider feature (e.g., an application facilitating provision of a reward) and may be changed by a user at any time.

According to some example embodiments, a user may select a third party feature from a list displayed to the user. For example, the user may scroll through a list of features on a display (e.g., display 125). A user may scroll through a list using buttons on a card (e.g., buttons 130-134). The list of features may be displayed to the user individually, in groups and/or all features may be simultaneously displayed.

According to some example embodiments, a third party feature associated with a button may be changed by a user, for example, on a graphical user interface (GUI) provided on a website, to allow a user to change the third party feature performed when the third party's feature button is selected by a user on the user's card or other device.

According to some example embodiments, a user may select a type of payment on card 100 via manual input interfaces (e.g., buttons 130-134). The manual input interfaces may correspond to displayed options (e.g., displayed on display 125). Selected information may be communicated to a magnetic stripe reader via a dynamic magnetic stripe communications device. Selected information may also be communicated to a device (e.g., a mobile telephonic device) including a capacitive sensor and/or other type of touch sensitive sensor. Display 125 may allow a user to select (e.g., via buttons) options on display 125 that instruct the card to communicate (e.g., via a dynamic magnetic stripe communications device, RFID and/or exposed IC chip) to use a debit account, credit account, pre-paid account, and/or point account for a payment transaction.

Lights 135-138 and 194-196 (e.g., light emitting diodes), may be associated with buttons 131-134 and 197-199. Each of lights 135-138 and 194-196 may indicate, for example, when a button is pressed. In a case where a button may activate card 100 for communications, a light may begin blinking to indicate card 100 is still active (e.g., for a period of time) while reducing power expenditure. Although not shown, a light may be provided for button 130.

Architecture 150 may be utilized with any card (e.g., any card 100). Architecture 150 may include, for example, processor 145, display 140, driving circuitry 141, memory 142, battery 143, radio frequency identification (RFID) 151, integrated circuit (IC) chip 152, electromagnetic field generators 170, 180, and 185, and read-head detectors 171 and 172.

Processor 145 may be any type of processing device, for example, a central processing unit (CPU) and/or a digital signal processor (DSP). Processor 145 may be, for example, an application specific integrated circuit (ASIC). Processor 145 may include on-board memory for storing information (e.g., triggering code). Any number of components may communicate to processor 145 and/or receive communications from processor 145. For example, one or more displays (e.g., display 140) may be coupled to processor 145. Persons skilled in the art will appreciate that components may be placed between particular components and processor 145. For example, a display driver circuit may be coupled between display 140 and processor 145.

Memory 142 may be coupled to processor 145. Memory 142 may store data, for example, that is unique to a particular card. Memory 142 may store any type of data. For example, memory 142 may store discretionary data codes associated with buttons of a card (e.g., card 100). Discretionary data codes may be recognized by remote servers to effect particular actions. For example, a discretionary data code may be stored in memory 142 and may be used to cause a third party service feature to be performed by a remote server (e.g., a remote server coupled to a third party service such as a rewards provider). Memory 142 may store firmware that, for example, controls triggering and/or the like.

Architecture 150 may include any number of reader communication devices. For example, architecture 150 may include at least one of IC chip 152, RFID 151 and a magnetic stripe communications device. IC chip 152 may be used to communicate information to an IC chip reader (not illustrated). IC chip 152 may be, for example, an EMV chip. RFID 151 may be used to communicate information to an RFID reader. RFID 151 may be, for example, an RFID device. A magnetic stripe communications device may be included to communicate information to a magnetic stripe reader. For example, a magnetic stripe communications device may provide electromagnetic signals to a magnetic stripe reader.

Different electromagnetic signals may be communicated to a magnetic stripe reader to provide different tracks of data. For example, architecture 150 may include electromagnetic field generators 170, 180, and 185 to communicate separate tracks of information to a magnetic stripe reader. Electromagnetic field generators 170, 180, and 185 may include a coil (e.g., each may include a coil) wrapped around one or more materials (e.g., a soft-magnetic material and a non-magnetic material). Each electromagnetic field generator may communicate information, for example, serially to a receiver of a magnetic stripe reader for a particular magnetic stripe track. According to at least one example embodiment, a single coil may communicate multiple tracks of data.

According to at least one example embodiment, a magnetic stripe communications device may change the information communicated to a magnetic stripe reader at any time. Processor 145 may, for example, communicate user-specific and card-specific information through RFID 151, IC chip 152, and/or electromagnetic generators 170, 180, and 185 to card readers coupled to remote information processing servers (e.g., purchase authorization servers). Driving circuitry 141 may be utilized by processor 145, for example, to control electromagnetic generators 170, 180 and 185. Driving circuitry 141 may, for example, be implemented by discrete elements. Driving circuitry 141 may, for example, be implemented as an application specific integrated circuit (ASIC).

Architecture 150 may include read head detectors 171 and 172. Read-head detectors 171 and 172 may be configured to sense the presence of a magnetic stripe reader (e.g., a read-head housing of a magnetic stripe reader). Information sensed by the read-head detectors 171 and 172 may be communicated to processor 145 to cause processor 145 to communicate information serially from electromagnetic generators 170, 180, and 185 to magnetic stripe track receivers in a read-head housing of a magnetic stripe reader. Read-head sensors may reduce power consumption and increase data security by communicating only within proximity of the read-head of a card reader.

Architecture 150 may include any type of detector used to detect and/or determine the proximity of a read-head. For example, read-head detectors 171 and 172 may include one or more capacitive sensors, one or more inductive sensors, one or more photoelectric sensors, one or more magnetic sensors, one or more thermal sensors and/or one or more sonic (e.g., ultrasonic) sensors.

Read-head detectors 171 and 172 may include a first sensor to detect the proximity of an object and a second sensor to detect a type of the object. For example, a capacitive sensor, which may consume relatively low or no power, may be used to detect a large number of different materials. The materials may include several types of normally encountered materials not normally used in read-heads. For example, non-read-head materials may include materials used in credit card reader construction outside of the read-head and/or human materials (e.g., a user's finger). Accordingly, a capacitive sensor may erroneously signal the detection of a read-head and data communication may be initiated. An inductive sensor, which may consume relatively higher power (e.g., as compared to a capacitive sensor), may not detect at least some of the materials not normally used in read-heads. Accordingly, by using both a capacitive sensor and an inductive sensor, accuracy with respect to read-head detection may be increased.

For example, a capacitive sensor may indiscriminately detect both a read-head and a user's finger, and an inductive sensor may not detect a user's finger. Accordingly, where a capacitive sensor detects an object, processor 145 may activate an inductive sensor. The inductive sensor may not detect an object. Accordingly, processor 145 may determine that a read-head is not detected. Read-head detection error may be reduced while maintaining a relatively low power consumption and improving data security. Data security may be improved by reducing erroneous card data transmission.

Sensors may be combined in a variety of ways to improve detection accuracy and data security. For example, read-head detectors 171 and 172 may include a capacitive sensor, an inductive sensor and a photoelectric sensor. The capacitive sensor may be used to detect an object, the inductive sensor may be used to reduce the number of possible types of the object and the photoelectric sensor may be used to detect the absence of light. The absence of light may, for example, occur where a card is not exposed (e.g., where a card is being swiped through a reader, as in a dip reader and/or in a motorized reader). Accordingly, read-head detection and data security may be improved. Persons skilled in the art in possession of example embodiments will appreciate that different types of sensors may be employed in different combinations and numbers to reduce false read-head detections and improve data security.

Figure 2:
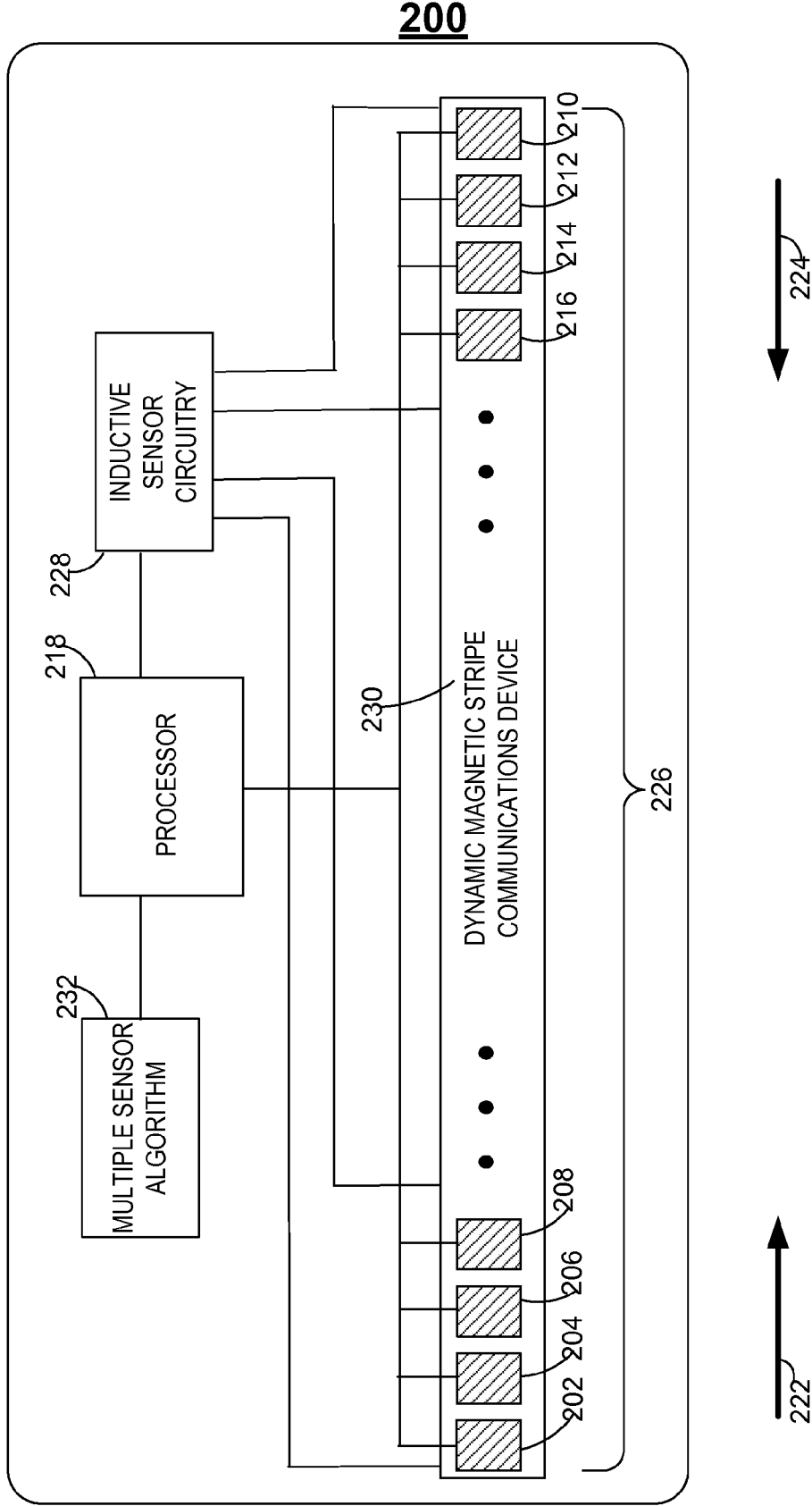
FIG. 2 is an illustration of a card constructed in accordance with the principles of the present invention.

FIG. 2 shows a card with an orientation of detectors 226 and dynamic magnetic stripe communication device 230, whereby one or more detectors 202-216 and dynamic magnetic stripe communication device 230 may be, for example, arranged along a length of card 200.

Detectors 202-216 may be provided, for example, as conductive pads using, for example, an additive technique, whereby patterns of a conductive element (e.g., copper) may be applied to a PCB substrate according to a patterning mask definition layer. Detectors 202-216 may be provided, for example, as conductive pads using, for example, a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

Processor 218, conductive pads 202-216, processor 218, dynamic magnetic stripe communication device 230, inductive sensor circuitry 228 and multiple sensor algorithm 232 may be combined to provide a multiple sensor detection system.

For example, each of conductive pads 202-216 may be utilized by processor 218 as capacitive sensing pads. Processor 218 may include the functionality to control and determine when an object is in the proximity of one or more conductive pads via a capacitive sensing technique. Dynamic magnetic stripe communications device 230 and inductive sensor circuitry 228 may be utilized by processor 218 as an inductive sensing device. For example, a processor may include the functionality to independently utilize multiple portions of dynamic magnetic stripe communications device 230 and determine when an object is in the proximity of one or more of the portions via an inductive sensing technique.

Figure 3:
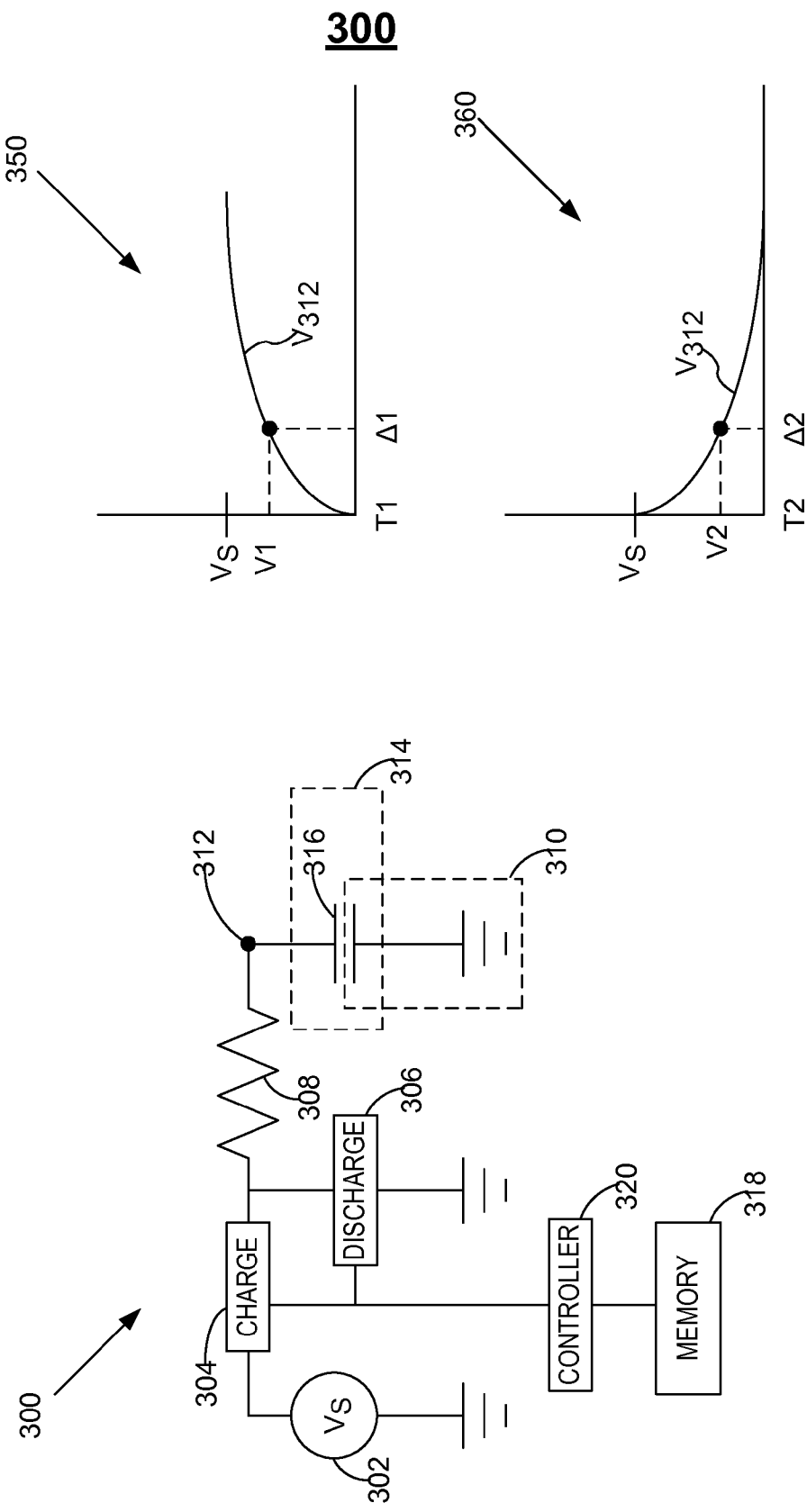
FIG. 3 is an illustration of a capacitive read-head sensor constructed in accordance with the principles of the present invention.

FIG. 3 shows capacitive detection circuitry 300. A conductive pad may be utilized, for example, as a conductor of a capacitive device within a resistor/capacitor (RC) circuit to determine the capacitance of a conductive pad and determine whether the capacitance is below, equal to, or above one or more predetermined thresholds.

A conductive pad may, for example, form a portion of a capacitive element, such that plate 316 of capacitive element 314 may be implemented by a conductive pad and the second plate of capacitive element 314 may be implemented by element 310. Element 310 may represent, for example, the device or object whose proximity or contact is sought to be detected.

The capacitance magnitude of capacitive element 314 may exhibit, for example, an inversely proportional relationship to the distance separation between plate 316 and device 310. For example, the capacitance magnitude of capacitive element 314 may be relatively low when the corresponding distance between plate 316 and device 310 may be relatively large. The capacitance magnitude of capacitive element 314 may be relatively large, for example, when the corresponding distance between plate 316 and device 310 is relatively small.

Capacitive detection may be accomplished, for example, via circuit 300 of FIG. 3. Through a sequence of charging and discharging events, an average capacitance magnitude for capacitive element 314 may be determined over time. In so doing, the spatial relationship (e.g., the separation distance) between plate 316 and device 310 may be determined.

Charge sequence 350, for example, may be invoked, such that charge circuit 304 may be activated at time T1, while discharge circuit 306 may remain deactivated. Accordingly, for example, current may flow through resistive component 308. In doing so, for example, an electrostatic field may be generated that may be associated with capacitive component 314. During the charge sequence, for example, the voltage at node 312 may be monitored to determine the amount of time required (e.g., $T_{CHARGE} = \Delta 1 - T1$) for the voltage at node 312, $V_{312}$, to obtain a magnitude that is substantially equal to, below, or above a first threshold voltage (e.g., equal to V1).

Discharge sequence 360, for example, may be invoked, such that discharge circuit 306 may be activated at time T2, while charge circuit 304 may remain deactivated. During the discharge sequence, for example, the electric field associated with capacitive element 314 may be allowed to discharge through resistive component 308 to a reference potential (e.g., ground potential). The voltage at node 312 may be monitored to determine the amount of time required (e.g., $T_{DISCHARGE} = \Delta 2 - T2$) for the voltage at node 312, $V_{312}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by capacitive element 314. For example, given that the magnitude of voltage, V1, may be equal to approxi mately 63% of the magnitude of voltage, $V_S$, then a first relationship may be defined by equation (1) as:

$$T_{CHARGE} = R_{308} * C1, \qquad (1)$$

where $R_{308}$ is the resistance magnitude of resistive element 308 and C1 is proportional to a capacitance magnitude of a capacitive element (e.g., capacitive element 314).

Similarly, for example, given that the magnitude of voltage, V2, is equal to approximately 37% of the magnitude of voltage, $V_S$, then a second relationship may be determined by equation (2) as:

$$T_{DISCHARGE} = R_{308} * C2, \qquad (2)$$

where C2 is proportional to a capacitance magnitude of capacitive element 314. The capacitance magnitudes, $C_1$ and $C_2$, may then be calculated from equations (1) and (2) and averaged to determine an average capacitance magnitude that is exhibited by capacitive element 314.

Persons skilled in the art will appreciate that circuits 304 and 306 may be activated and deactivated by controller 320. Accordingly, for example, controller 320 may control when the charge and discharge events occur. Persons skilled in the art will further appreciate that controller 320 may adjust a frequency at which circuits 304 and 306 may be activated and/or deactivated, thereby adjusting a sampling rate at which the capacitance magnitudes, $C_1$ and $C_2$, may be measured. In so doing, a sampling rate (e.g., a lower sampling rate) may be selected in order to select a power consumption rate of a card (e.g., a lower power consumption rate). Controller 320 may, for example, store capacitance magnitude measurements within memory 318. Accordingly, for example, multiple capacitance magnitudes may be stored for subsequent access by controller 320.

A conductive pad may be utilized, for example, as a conductor of a capacitive device within a resistor/capacitor (RC) circuit to determine the capacitance of a conductive pad and determine whether the capacitance is below, equal to, or above one or more predetermined thresholds.

Referring to FIG. 2, a series of charge and discharge sequences for pads 202-216 may be executed by processor 218 to determine, for example, a relative capacitance magnitude that is exhibited by each of pads 202-216. A series of charge and discharge sequences for each of pads 202-216 may be executed by processor 218, for example, in order to obtain a capacitance characteristic for each of pads 202-216 over time.

By comparing the time-based capacitance characteristic of each pad 202-216 to a threshold capacitance value, a determination may be made, for example, as to when pads 202-216 are in a proximity, or touch, relationship with a device whose presence is to be detected. For example, a sequential change (e.g., increase) in the relative capacitance magnitudes of pads 202-208, respectively, and/or pads 216-210, respectively, may be detected and a determination may be made that a device is moving substantially in direction 222 relative to card 200. A sequential change (e.g., increase) in the relative capacitance magnitudes of detectors 210-216, respectively, and/or 208-202, respectively, may be detected, for example, and a determination may be made that a device is moving substantially in direction 224 relative to card 200. Based on the detection, processor 218 may activate inductive sensor circuitry 228 in order to determine if the object is inductively detectable.

Persons skilled in the art will appreciate that by electrically shorting pairs of detectors together (e.g., pair 202/210, pair 204/212, pair 206/214, etc.) directional vectors 222 and 224 become insubstantial. For example, regardless of whether a device is moving substantially in direction 222 or substantially in direction 224 relative to card 200, a determination may nevertheless be made that a device is close to, or touching, card 200.

Figure 4:
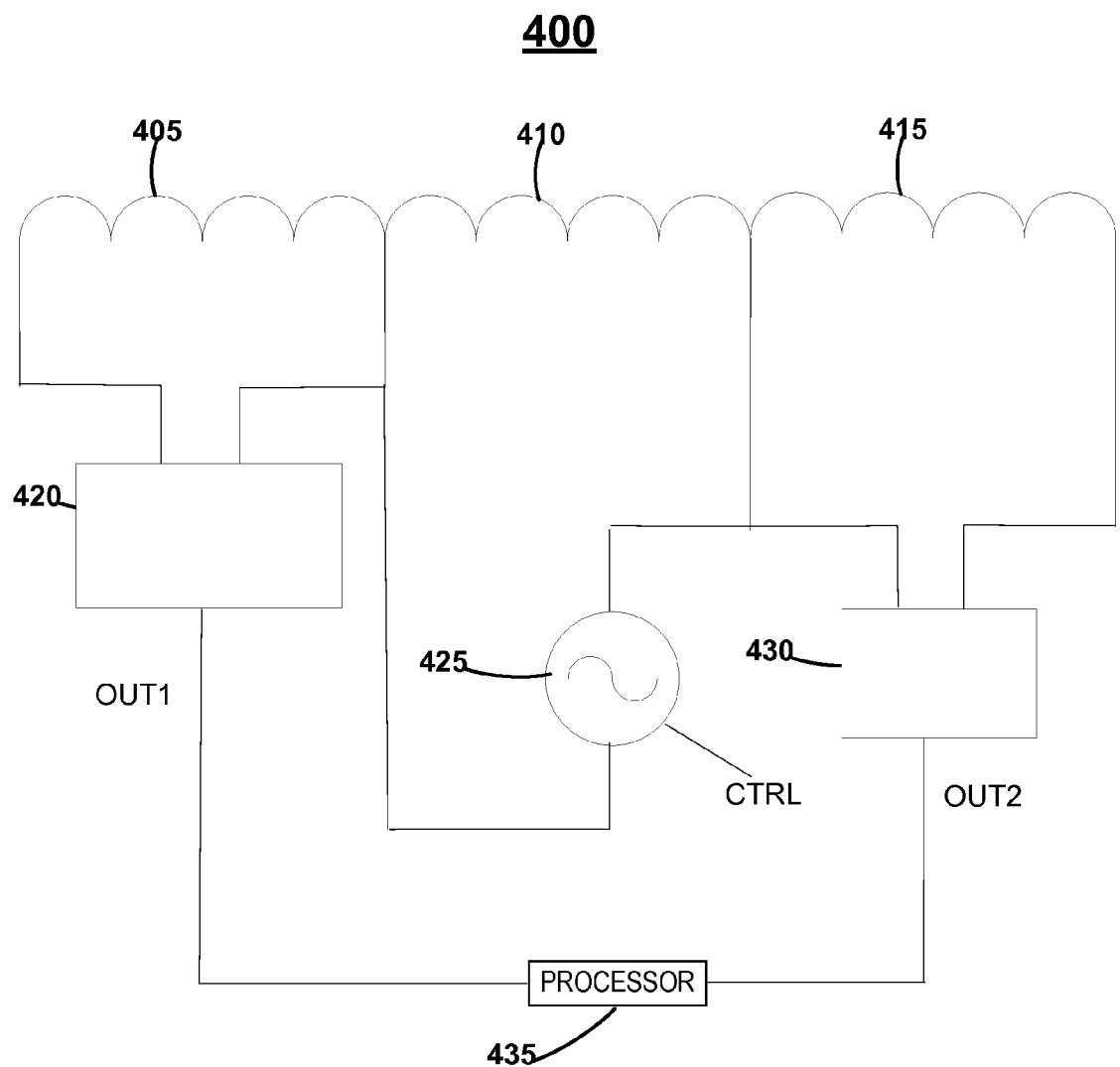
FIG. 4 is an illustration of an inductive read-head sensor constructed in accordance with the principles of the present invention.

FIG. 4 shows inductive detection circuitry 400. Referring to FIG. 4, inductive detection circuitry 400 may include, for example, coil portions 405-415, amplification and detection determination devices 420 and 430, oscillator 425 and processor 435.

Coil portions 405-415 may be portions of a coil, for example, portions of a coil in a dynamic magnetic stripe communications device. Coil portion 410 may be, for example, a central portion of a coil in a dynamic magnetic stripe communications device, and may be connected across oscillator 425, or may be one or more separate coils. Oscillator 425 may be, for example, an electronic circuit that produces a repetitive, oscillating electrical signal (e.g., an alternating current and/or voltage) and/or may be a signal from an output of a port on processor 435. A control signal CTRL may be communicated to oscillator 425 (e.g., by processor 435) to initiate application of the electrical signal to coil portion 410. A time-varying magnetic field may be generated by coil portion 410 due to the signal. The time varying magnetic field may induce repetitive, oscillating electrical signals in each of coil potions 405 and 415.

Coil portions 405 and 415 may be, for example, side portions of a coil in a dynamic magnetic stripe communications device. Although FIG. 4 shows coil portions 405 and 415 adjacent to coil portion 410, example embodiments are not so limited. Coil portions 405-415 may be, for example, separated by other coil portions (not shown).

Coil portion 405 may be connected to oscillator 425 (e.g., a high frequency oscillator), and connected across amplification and detection determination device 420. Amplification and detection determination device 420 may receive the oscillating signal induced in coil portion 405 by coil portion 410, and output a signal OUT1 to processor 435. Coil portion 415 may be connected to oscillator 425, and connected across amplification and detection determination device 430. Amplification and detection determination device 430 may receive the oscillating signal induced in coil portion 415 by coil portion 410, and output a signal OUT2 to processor 435. Signals OUT1 and OUT2 may indicate whether or not signals induced in coil portions 405 and/or 415 are less than, equal to or greater than a threshold signal value.

The threshold signal value may be based on the magnitude of the signals induced in coil portions 405 and 415 when coil portions 405 and 415 are adjacent to an object (e.g., a read-head of a card reader), and when coil portions 405 and 415 are not adjacent to an object.

Persons of ordinary skill in the art may appreciate that in the presence of a high frequency magnetic field, currents may be induced in a conductive object within the field. The currents may consume power due to resistance and energy in the field may be lost. Signal amplitude may decrease in side portions of a coil in the presence of a conductive object according to example embodiments. Accordingly, a read-head of a card reader may change the coupling between coil portion 410, and coil portions 405 and 415, such that a magnitude of the signal induced in coil portions 405 and 415 by coil portion 410 may decrease.

Referring to FIG. 2, inductive detection may be implemented by determining coupling responses in coil end sections and setting response threshold values. For example, an oscillating signal may be applied to a center portion of a coil in dynamic magnetic stripe communications device 230 by processor 218 via inductive sensor circuitry 228. A coupling response in the coil end sections may be determined both when an object is within proximity of card 200 and when no object is within proximity of card 200. The coupling response may be determined by, for example, measuring a current and/or voltage across the end coil sections. Based on a difference between the coupling responses, a threshold value may be determined. Multiple sensor algorithm 232 may utilize the threshold value to determine whether or not an object is detected.

According to at least one example embodiment, multiple threshold values may be determined in order to discriminate between multiple different objects. For example, multiple different objects may be passed in proximity to dynamic magnetic stripe communications device 230 to determine a coupling response of the end coil sections in the presence of each of the objects. The coupling response may be determined by, for example, measuring a current and/or voltage across the end coil sections in the presence of each object. One or more threshold signal values may be determined based on the coupling responses.

For example, a human finger, a skimmer, a first type of read-head and a second type of read-head may be passed within proximity of dynamic magnetic stripe communications device 230. A change in coupling between the center and end sections of the coil in magnetic stripe communications device 230 for each object may be determined. One or more thresholds may be set such that during normal operation processor 218 will activate dynamic magnetic stripe communications device 230 to communicate data in the presence of the first and second type of read-head, but not in the presence of the skimmer or human finger.

Accordingly, if the coupling response of card 200 in the presence of the skimmer is between that of the coupling responses of the first and second types of read-heads, and a coupling response in the presence of the human finger is less than the coupling response in the presence of any other of the objects, three separate threshold values may be set. During normal operation, by comparing the coupling response of the end sections to the one or more threshold values, a determination may be made, for example, as to when the coil end sections are in a proximity, or touch, relationship with a device whose presence is to be detected.

Inductive sensor circuitry 220 and dynamic magnetic stripe communications device 230 may be used in conjunction with, for example, one or more pads 202-216 to determine that a device (e.g., a read-head housing of a magnetic stripe reader) is in close proximity, or touching, one or more of pads 202-216. Processor 218 may, for example, utilize multiple sensor algorithm 232 to detect a device moving with respect to card 200. For example, multiple sensor algorithm 232 may analyze a capacitance change in one or more conductive pads to determine that a device is moving in relation to pads 202-216. Once a device is detected, processor 218 may, for example, apply an oscillating signal to a center portion of dynamic magnetic stripe communication device 230 and detect a coupling response of side portions of dynamic magnetic stripe communication device 230. If a coupling response indicates that (e.g., inductive detection) an object is detected, processor 218 may communicate with the detected device via dynamic magnetic stripe communications device 228.

Figure 5:
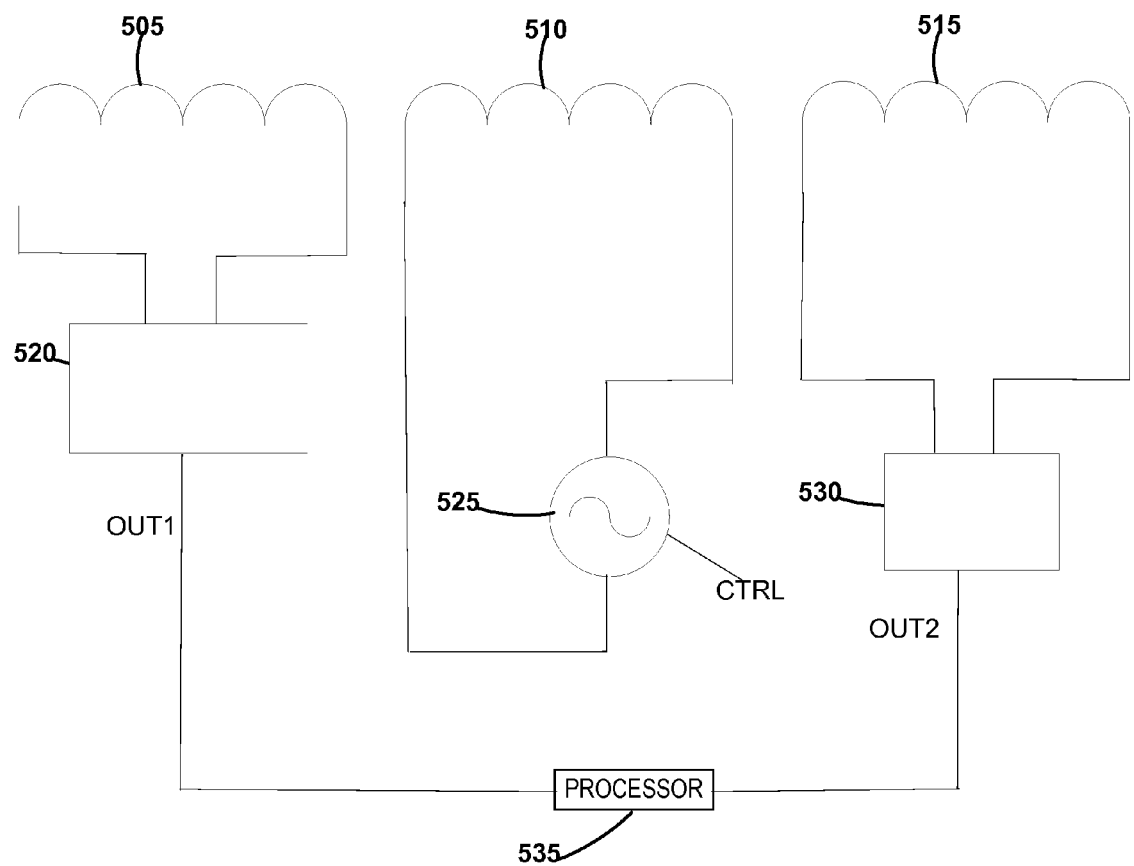
FIG. 5 is an illustration of an inductive read-head sensor constructed in accordance with the principles of the present invention.

FIG. 5 shows inductive detection circuitry 500. Referring to FIG. 5, inductive detection circuitry 500 may include, for example, coils 505-515, amplification and detection determination devices 520 and 530, oscillator 525 and processor 535.

Coil 510 may be, for example, a coil of a dynamic magnetic stripe communications device and/or a coil separate from the dynamic magnetic stripe communications device. Coil 510 may be connected across oscillator 525. Oscillator 525 may be, for example, an electronic circuit that produces a repetitive, oscillating electrical signal (e.g., an alternating current and/or voltage). Oscillator 525 may be, for example, a processor (e.g., a signal may be output from a port of a processor). A control signal CTRL may be communicated to oscillator 525 (e.g., by processor 535) to initiate application of the electrical signal to coil 510. A time-varying magnetic field may be generated by coil 510 due to the signal. The time varying magnetic field may generate repetitive, oscillating electrical signals in each of coils 505 and 515.

Coils 505 and 515 may be, for example, detection coils on opposite ends of a card. For example, coils 505 and 515 may be adjacent to capacitive sensors at ends of a card. Coil 505 may be connected across amplification and detection determination device 520. Amplification and detection determination device 520 may receive the oscillating signal induced in coil 505 by coil 510, and output a signal OUT1 to processor 535. Coil 515 may be connected across amplification and detection determination device 530. Amplification and detection determination device 530 may receive the oscillating signal induced in coil 515 by coil 510, and output a signal OUT2 to processor 535. Signals OUT1 and OUT2 may indicate whether or not signals induced in coil portions 505 and/or 515 are less than, equal to or greater than a threshold signal value indicating whether or not an object is inductively detected.

The threshold signal value may be based on the magnitude of a signal induced in coil 505 and/or coil 515 when coil 505 and/or coil 515 is adjacent to an object (e.g., a read-head of a card reader), and the magnitude of a signal when coil 505 and 515 are not adjacent to an object.

Figure 6:
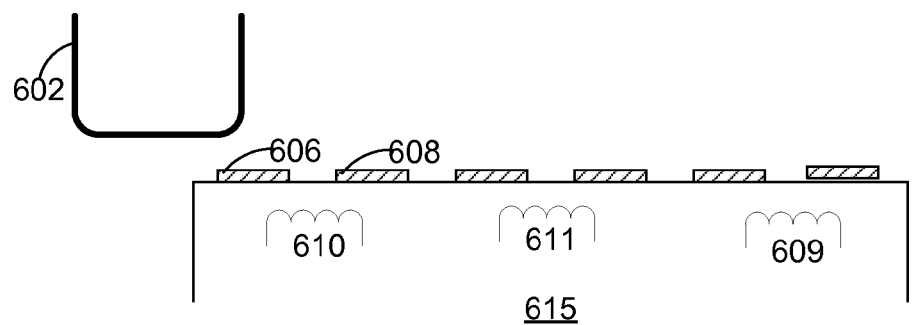
FIG. 6 is an illustration of a card constructed in accordance with the principles of the present invention.
Figure 6:
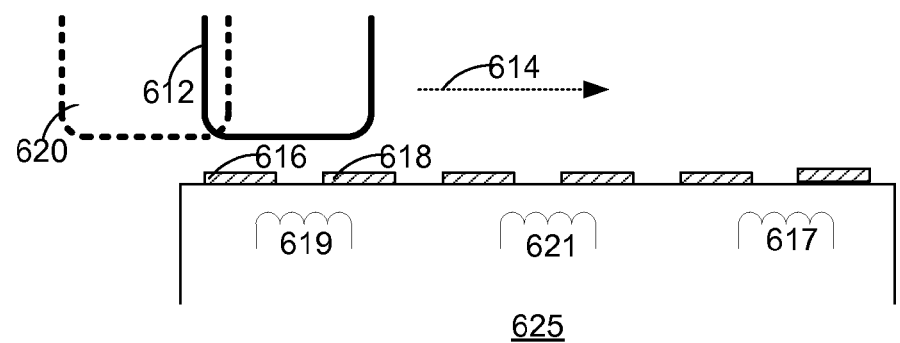
Figure 6:
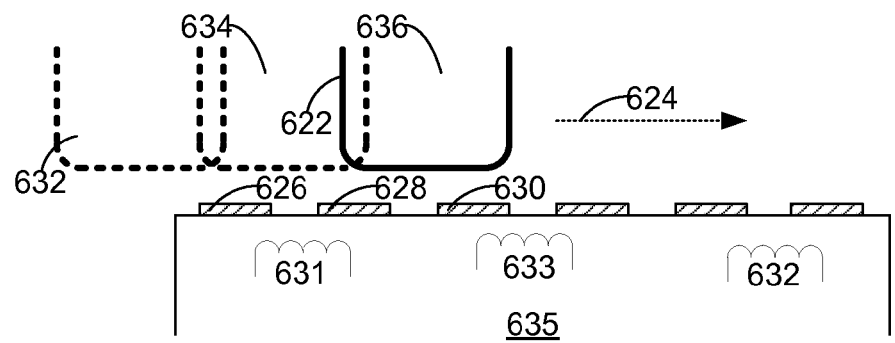

FIG. 6 shows a card that is in proximity to an object 602. Card 615 may be in proximity to object 602 such that a distance between conductive pad 606 and object 602 is less than a distance between conductive pad 608 and object 602. Accordingly, for example, a capacitance magnitude that may be associated with conductive pad 606 may be, for example, greater than a capacitance magnitude that may be associated with conductive pad 608. Persons of ordinary skill will appreciate that capacitance values may be relative to each pad and that a capacitance magnitude of a proximate pad may be equal to or less than a pad that is farther away from an object depending on, for example, manufacturing variation. Such pads may be in any case characterized such that the detected capacitances may be used to determine which pad is closer to an object.

A processor that may be monitoring the capacitance magnitudes of conductive pads 606 and 608 may determine, for example, that object 602 is close to conductive pad 606. Based on the determination, the processor may cause a time-varying signal to be applied to coil 611, and may monitor coils 610 and 609 to determine a property (e.g., relative conductivity) of object 602 (e.g., a read-head of a magnetic stripe reader).

Card 625 may be in proximity to a device (e.g., read-head 612) that may have moved from position 620 such that a distance between conductive pad 618 and device 612 may be slightly greater than a distance between conductive pad 616 and device 612. Accordingly, for example, a capacitance magnitude that may be associated with conductive pad 616 may be, for example, slightly greater than a capacitance magnitude that may be associated with conductive pad 618. In so doing, for example, a processor that may be monitoring the capacitance magnitudes of conductive pads 616 and 618 may determine that a device may be travelling in direction 614.

Further, a processor may determine that a device is slightly closer to conductive pad 616 than to conductive pad 618. The processor may initiate inductive detection when device 612 is at, for example, position 620, by applying a time-varying signal to coil 621, and may terminate the signal upon detecting device 612 via coil 619 and/or 617.

Card 635 may be in proximity to a device (e.g., read-head 622) that may have moved from position 632 to 634. Accordingly, for example, a capacitance magnitude that may be associated with conductive pad 628 may be slightly greater than a capacitance magnitude that may be associated with conductive pad 626. In so doing, for example, a processor that may be monitoring the capacitance magnitudes of conductive pads 626 and 628 may determine that a device may be travelling in direction 624. Further, a processor may determine that a device is slightly closer to conductive pad 628 than to conductive pad 626. The processor may initiate inductive detection when device 622 is at, for example, position 634 by applying a time-varying signal to coil 633, and may terminate the signal upon detecting device 622 via coil 631 and/or 632, and/or within a period of time.

Device 622 may move from position 634 to position 636. Accordingly, for example, a capacitance magnitude that may be associated with conductive pad 630, for example, may be slightly greater than a capacitance magnitude that may be associated with conductive pad 628. In so doing, for example, a processor that may be monitoring the capacitance magnitudes of conductive pads 630 and 628 may determine that a device may be travelling in direction 624.

A processor may determine, for example, that a device is first located closest to conductive pad 626, the device is then located closest to conductive pad 628, and the device is then located closest to conductive pad 630 in succession by detecting, for example, that a capacitance magnitude of conductive pad 626 changes (e.g., increases), followed by a capacitance change (e.g., increase) of conductive pad 628, and then followed by a capacitance change (e.g., increase) of conductive pad 630, respectively. In response to a sequential capacitance change in pads 626, 628, and 630, respectively, and a coupling response change in coil 631, a processor may activate one or more electromagnetic field generators to initiate a communications sequence with, for example, read-head 622. Each of the capacitance changes, the direction of movement and the inductive sensing may be used to determine that card 635 is moving with respect to a read-head in an expected fashion, for example, a swipe through a card reader. A communication sequence may be initiated upon card 635 determining that an expected sequence of events has occurred.

Sequences and relative timings of events may be known for various other types of readers (e.g., dip and/or motorized readers). Accordingly, data communication and data security may be improved. Persons of ordinary skill in the art will appreciate that read-head detection may occur in a similar fashion for movement in a direction opposite to direction 624.

A sequential capacitance change in conductive pads 626-630, respectively, may not occur. For example, a speed at which a device (e.g., read-head 622) travels in direction 624 relative to card 635 may cause a processor to detect a capacitance change, for example, in conductive pad 626 followed by a capacitance change in conductive pad 630, but a capacitance change in conductive pad 628 may not be detected. Accordingly, for example, a processor may execute a detection algorithm with an awareness of capacitance changes in non-adjacent conductive pads (e.g., conductive pads separated by one or more other conductive pads). In so doing, for example, a processor may nevertheless determine that a device is moving in proximity to a card and may activate a communications device in response to such a detection. A processor may, for example, detect devices moving at increased speeds (e.g., twice an average swipe speed) without sacrificing detection accuracy.

A processor may measure a magnitude of capacitance changes in conductive pads 626-630 that is not, for example, consistent with movement of a device in direction 624. For example, a processor may first measure a capacitance magnitude associated with conductive pad 626 that may be larger than a capacitance magnitude of either of conductive pads 628 and 630. A processor may next measure a capacitance magnitude associated with conductive pad 630 that may be larger than a capacitance magnitude of either of conductive pads 626 and 628. A processor may next measure a capacitance magnitude associated with conductive pad 628 that may be larger than a capacitance magnitude of either of conductive pads 626 and 630.

In so doing, for example, movement of a device in direction 624 may be considered to be inconsistent with such a capacitance characteristic, since sequential capacitance magnitude increases may not be detected in conductive pads 626, 628, and 630, respectively. A processor executing a multiple sensor algorithm may have an awareness that detected capacitance increases may be inconsistent with an actual direction of movement of a device. In so doing, for example, a processor may determine that a device is in proximity to card 635, is not moving in direction 624, and may not, for example, activate a communications device in response to such a detection.

Figure 7:
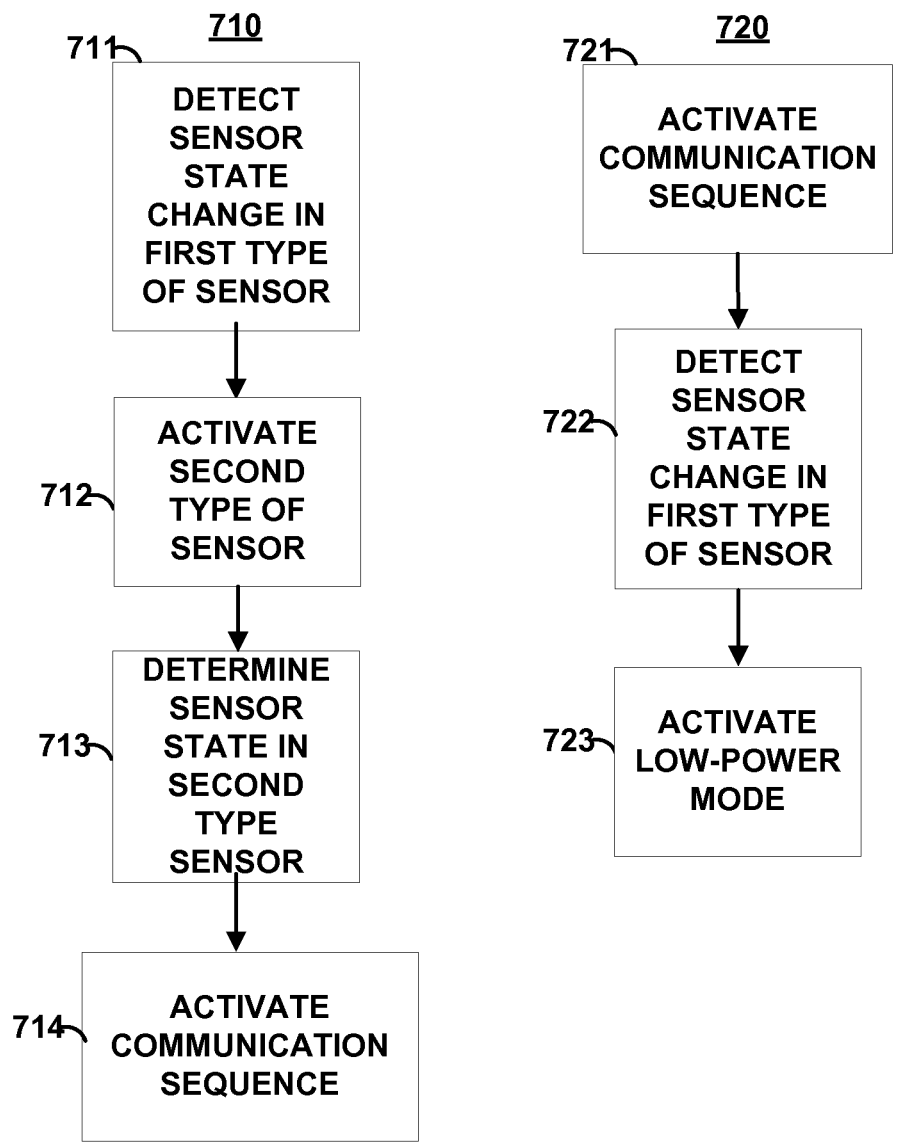
FIG. 7 is an illustration of a process flow in accordance with the principles of the present invention.

FIG. 7 shows a detection method flow diagram. Referring to sequence 710, a sensor state change (e.g., an increased capacitance) may be detected in a first type of sensor (e.g., as in step 711). A second type of sensor may be activated in response to the sensor state change (e.g., as in step 712). A state of the second type of sensor (e.g., an inductive detection of a conductive object) may be determined (e.g., as in step 713). Based on the first sensor state change and the state of the second type of sensor, a communication sequence may be activated (e.g., as in step 714) and/or the second type of sensor may be deactivated.

A card may be fully operational (e.g., as in step 721 of sequence 720), whereby a communication sequence may be activated after a device is detected to be in proximity, or touching, the card. Once the communication sequence is completed, a state change of a first type of sensor (e.g., an increased capacitance) may be detected (e.g., as in step 722). A low-power mode of a card may be activated based on the state change detection (e.g., as in step 723).

Figure 8:
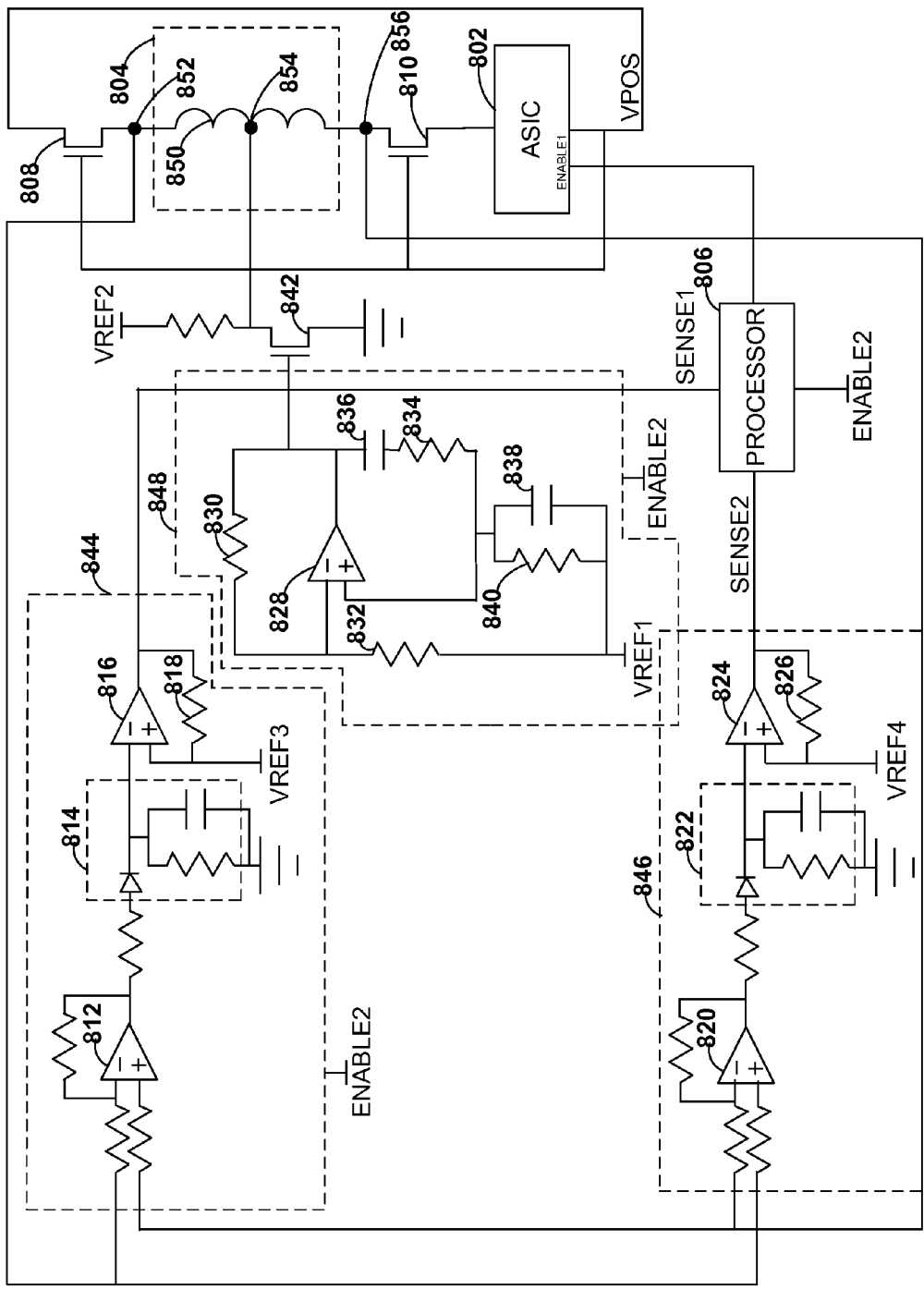
FIG. 8 is an illustration of an inductive read-head sensor constructed in accordance with the principles of the present invention.

FIG. 8 shows inductive detection circuitry 800. Inductive detection circuitry 800 may include, for example, one or more coils (e.g., dynamic magnetic stripe communications device 804), a coil driver (e.g., ASIC 802), processor 806, excitation device (e.g., oscillator 848) and one or more sensors (e.g., sensor 844 and/or sensor 866). Dynamic magnetic stripe communications device 804 may, for example, include a first coil (e.g., coil 850) for communicating a first track of magnetic stripe information to a read head of a magnetic stripe reader, a second coil (not shown) for communicating a second track of magnetic stripe information to the read head of the magnetic stripe reader and a third coil (not shown) for communicating a third track of magnetic stripe information to the read head of the magnetic stripe reader.

Any one or more coils of dynamic magnetic stripe communications device 804 may be used in a first mode of operation as a magnetic stripe communications device and in a second mode of operation, dynamic magnetic stripe communications device 804 may be used as a component of inductive detection circuitry 800. In the first mode of operation, processor 806 may activate ASIC 802 (e.g., via assertion of signal ENABLE1 of ASIC 802), which may in turn cause ASIC 802 to assert a signal (e.g., ASIC 802 may assert signal VPOS to an active high voltage level). In so doing, for example, switch devices (e.g., NFET 808 and NFET 810) may transition to a conductive state, thereby coupling ASIC 802 to one or more coils of dynamic magnetic stripe communications device 804 (e.g., node 856 is electrically coupled to ASIC 802 via NFET 810 and node 852 is electrically coupled to ASIC 802 via NFET 808).

In the second mode of operation, processor 806 may deactivate ASIC 802 (e.g., via deassertion of signal ENABLE1 of ASIC 802), which may in turn cause ASIC 802 to deassert a signal (e.g., ASIC 802 may deassert signal VPOS to an inactive low voltage level). In so doing, for example, switch devices (e.g., NFET 808 and NFET 810) may transition to a non-conductive state, thereby decoupling ASIC 802 from one or more coils of dynamic magnetic stripe communications device 804 (e.g., node 856 is electrically isolated from ASIC 802 via NFET 810 and node 852 is electrically isolated from ASIC 802 via NFET 808). In addition, for example, processor 806 may assert signal, ENABLE2, thereby activating oscillator 848, sensor circuit 844 and/or sensor circuit 846 during the second mode of operation.

Oscillator circuit 848 may, for example, include an operational amplifier (OP AMP 828), a feedback network (e.g., resistors 830 and 832) and a frequency selection network (e.g., resistors 834,840 and capacitors 836,838). VREF1 may, for example, be a reference voltage (e.g., ground potential) when OP AMP 828 operates between positive and negative power supply rails (e.g., an output signal generated by OP AMP 828 is a signal having a direct current (DC) component at or near ground potential). VREF1 may, for example, be a reference voltage (e.g., a positive potential greater than ground potential) when OP AMP 828 operates between a positive power supply rail and ground potential (e.g., an output signal generated by OP AMP 828 is a signal having a direct current (DC) component at a positive potential above ground potential).

Oscillator circuit 848 may, for example, generate a signal (e.g., a square wave signal) having a frequency that may be selected by a frequency selection network (e.g., resistors 834, 840 and capacitors 836,838), where resistors 834,840 may be selected to have equivalent resistance magnitudes approximately between 1500 ohms and 5000 ohms (e.g., approximately 3300 ohms) and capacitors 836,838 may be selected to have equivalent capacitance magnitudes approximately between 20 and 80 pF (e.g., approximately 47 pF). The signal frequency, $f_{osc}$, generated by oscillator circuit 848 may be approximated as, $fosc=1/2\pi C*R$, where C is the capacitance magnitude of capacitors 836,838 and R is the resistance magnitude of resistors 834,840. Accordingly, for example, the sinusoidal frequency, $f_{osc}$, generated by oscillator circuit 848 may be between approximately 400 kHz and 5 MHz (e.g., approximately 500 kHz).

Feedback network (e.g., resistors 830 and 832) of oscillator circuit 848 may, for example, be used to select a voltage gain of OP AMP 828, such that the overall gain of oscillator circuit 848 is at, or near, unity when a signal at frequency, $f_{osc}$, is being generated. Accordingly, for example, a ratio of the resistance magnitude of resistor 830 to the resistance magnitude of resistor 832 may be approximately between 2 and 10 (e.g., approximately equal to 5).

In the second mode of operation, for example, oscillator circuit 848 may generate a signal to directly or indirectly excite a portion of dynamic magnetic stripe communications device 804 (e.g., center-tap node 854 of coil 850). In one embodiment, for example, the signal may transition transistor 842 between conductive and non-conductive states, thereby applying a signal (e.g., a voltage signal approximately equal to ground potential) to node 854 when transistor 842 is conductive and applying a signal (e.g., a voltage signal approximately equal to VREF2) to node 854 when transistor 842 is non-conductive. In so doing, for example, at least a portion of dynamic magnetic stripe communications device 804 may be excited during the second mode of operation.

A signal (e.g., a voltage signal) that may be indicative of an excitation of at least one coil of dynamic magnetic stripe communications device 804 during the second mode of operation may be sensed by sensor 844 and/or 846 at nodes 852 and/or 856, respectively. One or more differential amplifiers (e.g., amplifier 812 and/or 820) may, for example, be used to sense the difference between a signal present at a node (e.g., node 852) as compared to a signal present at a different node (e.g., node 856).

In the absence of a proximity, or touch, relationship with an object (e.g., a read head of a magnetic stripe reader) during the second mode of operation, for example, the sensed difference between a signal present at node 852 as compared to a signal present at node 856 may be substantially equal to zero. Accordingly, sensors 844 and/or 846 may provide a difference signal (e.g., a signal indicative of a zero difference) to indicate that no object may be in a touch, or proximity, relationship to dynamic magnetic stripe communications device 804 during the second mode of operation.

In the presence of a proximity, or touch, relationship with an object (e.g., a read head of a magnetic stripe reader) during the second mode of operation, for example, the sensed difference between a signal present at node 852 as compared to a signal present at node 856 may be substantially non-zero. Accordingly, sensors 844 and/or 846 may provide a difference signal (e.g., a signal indicative of a non-zero difference) to indicate that an object may be in a touch, or proximity, relationship to dynamic magnetic stripe communications device 804 during the second mode of operation.

Differential amplifier 812 of sensor 844 may, for example, provide a difference signal that is indicative of a magnitude of a signal present at node 852 subtracted from a magnitude of a signal present at node 856. Differential amplifier 820 of sensor 846 may, for example, provide a difference signal that is indicative of a magnitude of a signal present at node 856 subtracted from a magnitude of a signal present at node 852.

Peak detector 814 may, for example, receive a difference signal generated by differential amplifier 812 and/or peak detector 822 may, for example, receive a difference signal generated by differential amplifier 820. Excursions (e.g., maximum positive excursions) of the difference signal generated by differential amplifier 812 and/or differential amplifier 820 may, for example, forward bias a diode of peak detector 814 and/or 822, which may allow a capacitor of peak detector 814 and/or 822 to charge to a voltage indicative of such a maximum positive excursion, where the voltage may be maintained by the capacitor for a period of time (e.g., time enough for the difference signal generated by differential amplifier 812 and/or differential amplifier 820 to be sensed and processed by processor 806). A resistance may, for example, be placed in parallel with the capacitor of peak detector 814 and/or 822 in order to allow the capacitor of peak detector 814 and/or 822 to discharge after a period of time (e.g., after the difference signal generated by differential amplifier 812 and/or differential amplifier 820 has been sensed and processed by processor 806).

Comparators 816 and 824 of sensors 844 and 846, respectively, may compare the maximum positive signal excursions as may be generated by peak detectors 814 and 822, respectively, to a reference potential (e.g., VREF3 and VREF4, respectively). Comparator 816 may, for example, compare a maximum of the difference signal, $V_{856}-V_{852}$, as may be generated by peak detector 814, to VREF3, where $V_{856}$ is the voltage at node 856 and $V_{852}$ is the voltage at node 852. If the difference signal is below VREF3, then an output of comparator 816 (e.g., signal SENSE1) may be at a logic high level, whereas if the difference signal is above VREF3, then an output of comparator 816 (e.g., signal SENSE1) may be at a logic low level. Resistor 818 may be used to provide hysteresis, so that an output of comparator 816 does not oscillate when a magnitude of the difference signal present at the inverting input to comparator 816 is at, or near, the magnitude of VREF3.

Similarly, comparator 824 may, for example, compare a maximum of the difference signal, $V_{852}-V_{856}$, as may be generated by peak detector 822, to VREF4, where $V_{856}$ is the voltage at node 856 and $V_{852}$ is the voltage at node 852. If the difference signal is below VREF4, then an output of comparator 824 (e.g., signal SENSE2) may be at a logic high level, whereas if the difference signal is above VREF4, then an output of comparator 816 (e.g., signal SENSE2) may be at a logic low level. Resistor 826 may be used to provide hysteresis, so that an output of comparator 824 does not oscillate when a magnitude of the difference signal present at the inverting input to comparator 824 is at, or near, the magnitude of VREF4.

Processor 806 may, for example, monitor signals, SENSE1 and/or SENSE2, as may be produced by sensors 844 and/or 846, respectively, to make a determination as to whether an object (e.g., a read head of a magnetic stripe reader) is in a proximity, or touch, relationship to dynamic magnetic stripe communications device 804 during the second mode of operation.

Persons skilled in the art will appreciate that the present invention is not limited to only the embodiments described, and that features described in one embodiment may be used in a different embodiment. The present invention more generally involves dynamic information and devices. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
   detecting, by a card, an object with a capacitive sensor;
   activating an inductive sensor; and
   detecting conductivity, by the card, using the inductive sensor.

2. The method of claim 1, further comprising:
   activating a third type of sensor; and
   detecting an ambient property using the third type of sensor.

3. The method of claim 1, further comprising:
   activating a third type of sensor; and
   detecting an ambient property using the third type of sensor,
   wherein the third type of sensor is a photoelectric sensor.

4. The method of claim 1, further comprising:
   activating a dynamic magnetic stripe communications device upon the detection of the object by capacitive sensor and the detection of conductivity by the inductive sensor.

5. A card, comprising:
   a capacitive sensor operable to detect an external object;
   an inductive sensor operable to detect conductivity of the external object; and
   a processor operable to communicate data based on the detection of the external object and the conductivity of the external object.

6. The card of claim 5, further comprising:
   a dynamic magnetic stripe communications device,
   wherein the processor is operable to communicate data via the dynamic magnetic stripe communications device, and
   the inductive sensor includes at least a portion of the dynamic magnetic stripe communications device.

7. The card of claim 5, further comprising:
   a dynamic magnetic stripe communications device,
   wherein the processor is operable to communicate data via the dynamic magnetic stripe communications device,
   the dynamic magnetic stripe communications device includes at least one coil, and
   the inductive sensor includes at least a portion of one coil selected from the group consisting of the at least one coil and a separate coil.

8. The card of claim 5, wherein the inductive sensor includes at least two coils.

9. The card of claim 5, further comprising:
   a third sensor,
   wherein the third sensor is a type of sensor selected from the group consisting of a photoelectric sensor, a magnetic sensor, a thermal sensor and a sonic sensor.

10. The card of claim 5, further comprising an oscillator.

11. The card of claim 5, further comprising an amplification and detection determination device.

12. The card of claim 5, further comprising:
    at least one amplification and detection determination device,
    wherein the processor is operable to communicate data based on an output of the at least one amplification and detection determination device.

13. The card of claim 5, further comprising:
    a display; and
    a button.

14. The card of claim 5, further comprising:
    an RFID; and
    an EMV chip.

* * * * *